US006550315B2

(12) United States Patent
Streib

(10) Patent No.: US 6,550,315 B2
(45) Date of Patent: Apr. 22, 2003

(54) METHOD AND ARRANGEMENT FOR CHECKING THE TIGHTNESS OF A VESSEL

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/833,574

(22) Filed: Apr. 13, 2001

(65) Prior Publication Data

US 2001/0029776 A1 Oct. 18, 2001

(30) Foreign Application Priority Data

Apr. 13, 2000 (DE) ........................................ 100 18 441

(51) Int. Cl.[7] ................................................ G01M 3/04
(52) U.S. Cl. ..................................... 73/49.7; 73/40.5 R
(58) Field of Search ............................... 73/40, 40.5 R, 73/49.7, 118.1; 123/520; 702/51

(56) References Cited

U.S. PATENT DOCUMENTS 5,273,020 A * 12/1993 Hayami ...................... 123/520
5,299,544 A * 4/1994 Kitamoto et al. ........... 123/520
5,347,971 A * 9/1994 Kobayashi et al. ......... 123/520
5,349,935 A 9/1994 Mezger et al.
5,390,645 A * 2/1995 Cook et al. ................ 123/520
5,483,942 A * 1/1996 Perry et al. ................ 123/520
5,817,925 A * 10/1998 Cook et al. .................... 73/40
5,890,474 A * 4/1999 Schnaibel et al. .......... 123/520
5,898,103 A 4/1999 Denz et al.
6,014,958 A * 1/2000 Miwa et al. ................ 123/520
6,089,081 A * 7/2000 Cook et al. ................ 73/118.1
6,119,663 A * 9/2000 Okuma ....................... 123/520
6,131,550 A 10/2000 Fritz et al.
6,161,423 A * 12/2000 Okuma .......................... 73/40
6,182,642 B1 * 2/2001 Ohkuma ..................... 123/520
6,321,728 B1 * 11/2001 Ohkuma ..................... 123/520

FOREIGN PATENT DOCUMENTS

DE 195 02 776 6/1996

* cited by examiner

*Primary Examiner*—Hezron Williams
*Assistant Examiner*—Charles D Garber
(74) *Attorney, Agent, or Firm*—Walter Ottesen

(57) ABSTRACT

An active charcoal filter (20) of a tank-venting system stores fuel vaporizing in a tank (10). In order to check the operability of the tank-venting system, a leakage diagnostic unit (60) having a pump (50) is provided wherein the pump (50) is connected downstream of a switchover valve (70). A reference leak (81) is arranged parallel to the switchover valve (70). The switchover valve (70) includes two switching positions I and II. In the position I, the pump (50) is pressure-conductively connected to the line (80) and then pumps ambient air into the line (80) through the reference leak (81). The pumped flow, which is present at the output (51) of the pump (50), is, in the position I of the switchover valve (70) pure ambient air and, in the position II of the switchover valve (70), is air cleaned by the active charcoal filter (20). The pumped flow can therefore be outputted to the ambient of the vehicle via a line (52) without problems for the environment. Alternatively, the pumped flow at the output (51) of the pump (50) can be supplied to the intake manifold (40) via a return line. The tightness check takes place by detecting the current, which is to be supplied to the pump motor, and by determining whether the pumped flow, which is to be pumped by the pump (50) into the tank-venting system, deviates from the pumped flow which is present when introducing the underpressure via the reference leak.

2 Claims, 2 Drawing Sheets

METHOD AND ARRANGEMENT FOR CHECKING THE TIGHTNESS OF A VESSEL

FIELD OF THE INVENTION

The invention relates to a method and an arrangement for checking the operability of a vessel, especially a tank-venting system of a motor vehicle including a tank and an adsorption filter. The adsorption filter is connected to the tank via a connecting line and has a venting line as well as a pressure source connected forward of the venting line.

BACKGROUND OF THE INVENTION

In various areas of technology, vessels must be checked as to operability, that is, as to tightness. Accordingly, for example, in chemical processing technology, it is important to check the tightness of vessels. Furthermore, it is also necessary in the area of motor vehicles to check the tightness of tank systems.

In this context, reference is made to more rigorous statutory requirements for the operation of internal combustion engines which are being sought in several countries, such as in the United States, by the governments thereof. In accordance with these requirements, it is, for example, necessary that motor vehicles, which utilize volatile fuels such as gasoline, have a control device as mentioned initially herein which can also find an existing leak in the tank or in the entire fuel tank system.

A method and an arrangement for checking the operability of a tank-venting system of a motor vehicle is disclosed, for example, in U.S. Pat. Nos. 5,349,935; 5,890,474; 6,131,550; and, 5,898,103. In these methods and arrangements, an overpressure is introduced into the tank-venting system and a conclusion is drawn as to the presence of a leak from an evaluation of the pressure trace.

Japanese patent publication 6-173837 and U.S. Pat. No. 5,347,971 disclose methods for checking the operability of a tank-venting system wherein a reference leak is switched into the tank-venting system and wherein a statement as to the presence of a leak is made from a comparison of the measurements with and without the reference leak.

In addition, it is known from U.S. Pat. No. 5,890,474 that a backpressure is formed between a pump and a reference leak whereby the pump rpm is lowered and the flow capacity of the pump is increased. The steady-state flow, which adjusts, is stored and, thereafter, the pumped air flow of the pump is pumped via a switchover valve past a reference leak into the tank. If the tank is tight, then a higher pressure builds up than when pumping against the reference leak. The flow capacity of the pump is therefore higher. For a leak less than the reference leak, the pressure which adjusts lies below the reference pressure and the flow capacity is therefore less.

When there is a leak present in the tank system, it can happen in these methods and arrangements during the diagnostic procedure that slight quantities of the hydrocarbon-containing vapors are outputted to the environment via the leak because of the generated overpressure. Measurements and computations have shown that these quantities can be neglected even when applying the strongest emission standards. The foregoing notwithstanding, it would be more advantageous when even the above-mentioned slight emissions would not occur.

SUMMARY OF THE INVENTION

In view of the above, it is an object of the invention to provide a method and an arrangement of the kind described above which are so improved that the above-mentioned slight emissions are completely avoided.

It is intended that, with the method and arrangement mentioned initially herein, the smallest possible amounts of toxic substances reach the environment during a function or tightness test of the vessel.

The method of the invention is for checking the operability of a vessel having a venting line. The method includes the steps of: providing a pressure source and connecting the pressure source to the venting line; generating an underpressure in the vessel and obtaining at least one of:

(a) a pressure trace of the pressure in the vessel; and, (b) a volume flow moved by the pressure source; and, drawing a conclusion as to the presence of a leak in the vessel from at least one of the pressure trace and the volume flow.

A special characteristic of the method of the invention is that an underpressure is generated in the vessel and a conclusion is drawn as to the presence of a leak from the pressure trace and/or the pumped volume flow. The underpressure is generated by means of a pressure source through the adsorption filter. Compared to the known methods, no air is pumped into the vessel because of a reversal of the pumping direction; instead, the occurring gases or vapors are drawn by suction from the vessel. With the suggested underpressure method, increased hydrocarbon emissions because of the presence of a possibly present leak are effectively avoided. Especially the gases and vapors, which are drawn in by suction by the pressure source, are completely liberated from hydrocarbon substances because of the active charcoal filter connected between the vessel and the pressure source. Accordingly, these gases and vapors can then be outputted to the environment without problems for the environment.

Preferably, it is provided in the method of the invention that the vessel and a reference leak, which is connected in parallel to the vessel, are alternately charged with underpressure. The pressure trace or the volume flow pumped by the pressure source is detected during the underpressure in the vessel as well as during the underpressure at the reference leak. Then, a comparison is made of the pressure traces or volume flows and a conclusion is drawn therefrom as to the presence of leak. In this way, a more precise statement with respect to the presence of a leak can be made. The air flow, which is inducted from the reference leak, is already free of toxic substances and can therefore be outputted to the environment without problems for the environment.

In one embodiment of the method of the invention, it is provided that at least one operating characteristic variable of the pressure source is detected when generating the underpressure for determining the pressure trace and/or the pumped volume flow. From the above, a conclusion is drawn as to the presence of a leak. This makes possible an especially simple detection of the quantities required for the determination of the leak.

It can be especially provided that at least one of the following can be used as operating characteristic variable(s): the current drawn by the pressure source, the electric voltage applied to the pressure source and the rpm of the pressure source.

The pumped flow of the pressure source can be guided into an intake system of the engine of the vehicle in order to even more effectively avoid the output of toxic substances to the ambient.

In the arrangement of the invention, it is especially provided that the pumping device of the pressure source is so adjusted that an underpressure is generated in the vessel by means of the pressure source and that an electric circuit unit is provided for detecting and evaluating at least one operating characteristic variable of the pressure source during the underpressure in the vessel.

Preferably, the arrangement includes a reference leak arranged parallel to the vessel and the reference leak can be connected alternatively to the vessel and the pressure source via a switching device such as a switching valve.

In one embodiment, it is provided that the pumping output of the pressure source can be connected to the intake system of an engine of the vehicle via a return line.

The pressure source itself is preferably realized as a pump such as a vane-cell pump.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
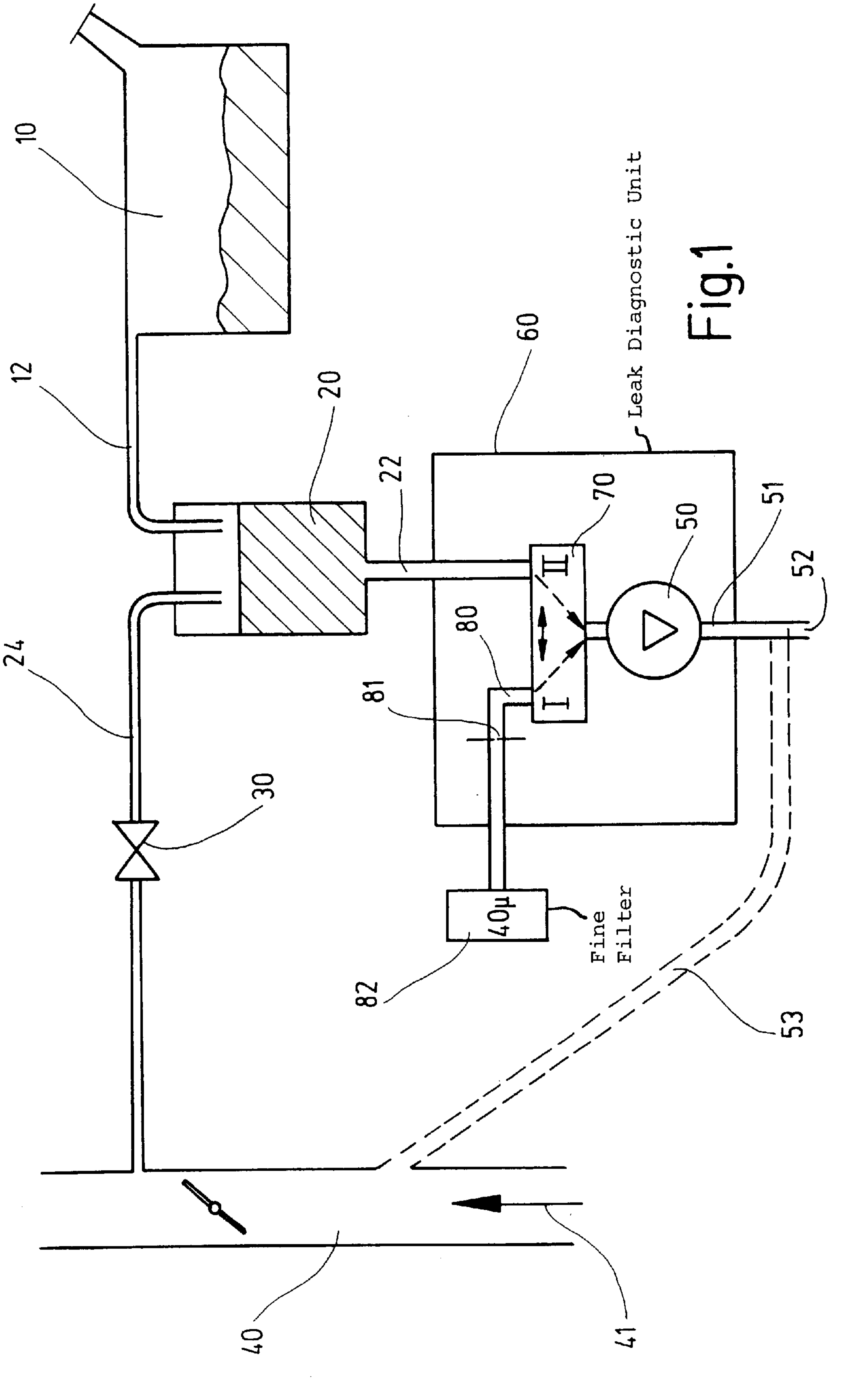
FIG. 1 is a schematic of a tank-venting system wherein the method of the invention can be applied; and, FIG. 2 is a graph showing the characteristic time-dependent trace of the motor current of the underpressure pump of the tank-venting system shown in FIG. 1.

The tank-venting system shown schematically in FIG. 1 includes an active charcoal filter 20 which is connected to a tank 10 via a tank connecting line 12. The intake manifold 40 of an internal combustion engine (not shown) is connected to a tank-venting valve 30 via a line 42. The arrow 41 shows the flow direction of the inducted air.

The active charcoal filter 20 stores fuel vaporized in the tank 10. The tank-venting valve 30 is driven to open by a control unit (not shown). When the tank-venting valve 30 is open, air is drawn through the active charcoal filter 20 from the ambient and the filter 20 then releases the stored fuel to the inducted air. Furthermore, the tank-venting system includes a passive filter (not shown) which connects the system with ambient air from the ambient of the vehicle. More specifically, the filter connects a line 22 to the ambient air and this line 22 is connected forward of the active charcoal filter.

During operation of the vehicle or its engine or when tanking the tank 10, volatile hydrocarbon vapors form in the tank 10 which reach the active charcoal filter 20 via the line 12 and are reversibly bonded in the filter 20 in a manner known per se.

The tank-venting valve 30 is normally closed. The tank-venting valve 30 is driven by the control unit at regular time intervals so that a specific partial pressure of the underpressure, which is present in the intake manifold 40, is supplied to the active charcoal filter 20 via the line 24. This leads to the situation that the stored hydrocarbon vapors are drawn by suction from the active charcoal filter 20 via the line 24 and via the tank-venting valve 30 into the intake manifold 40 in order to finally be supplied to the internal combustion engine for combustion and final disposal. In this operation of regeneration of the active charcoal filter 20, scavenging air is drawn by suction into the active charcoal filter 20 via the line 22 and the passive filter whereby the actual scavenging effect is effected.

A leak diagnostic unit 60 is provided to diagnose the operability or tightness of the tank-venting system. The leak diagnostic unit 60 includes a pump 50 which is connected to the control unit (not shown). The pump 50 is connected downstream of a switchover valve 70 which can, for example, be a 3/2 directional valve. A reference leak 81 is arranged in a separate branch 80 parallel to the switchover valve 70. The size of the reference leak 81 is so selected that it corresponds to the size of the leak to be detected. The switchover valve 70 includes two switching positions I and II. In the position I, the pump 50 is connected to conduct pressure with the line 80 and then pumps ambient air through the reference line 81 into the line 80. A fine filter 82 is connected forward of the reference leak in order to prevent the reference leak from becoming obstructed with inducted particles.

The pumping flow, which is present at the output 51 of the pump 50, is pure ambient air in the position I of the switchover valve 70 and is air purified by the charcoal filter 20 in the position II of the switchover valve 70. The pumped flow can therefore be outputted without problems for the environment via a line 52 to the ambient of the vehicle. En order to now ensure that even the smallest amount of contamination of the pumped flow coming from the active charcoal filter 20 does not reach the ambient it can be provided that the pumped flow is supplied to the intake manifold 40 at the output 51 of the pump 50 via a return line. This is done via a line 53 shown in phantom outline in FIG. 1 and while the engine of the vehicle is running. The pumped flow is supplied to the intake manifold 40 downstream (see arrow direction 41).

The tightness check of the tank-venting system is described in U.S. Pat. No. 5,890,474, which is incorporated herein by reference. By detecting the current supplied to the pump motor, it is determined whether the pumped flow, which is to be introduced into the tank-venting system by the pump 50, deviates from the pumped flow present when introducing the underpressure via the reference leak. The essential difference to the present invention is that an underpressure is generated with the method and arrangement according to the invention.

Figure 2:
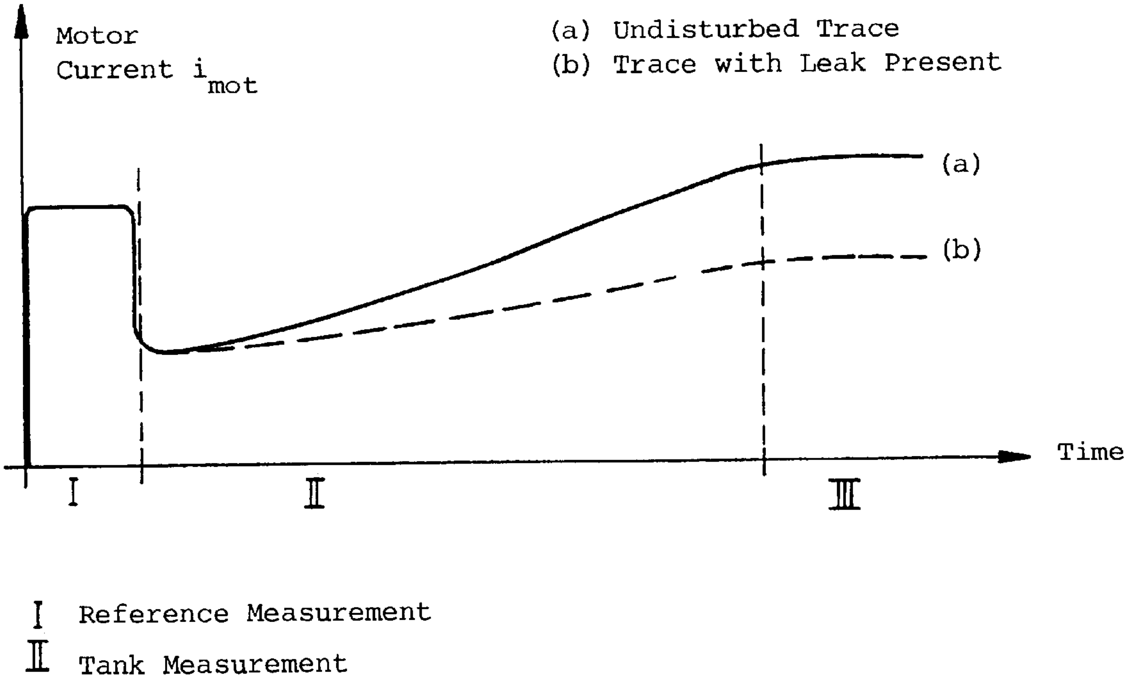

FIG. 2 shows the time-dependent trace of the electric current, that is, of the pump motor current which adjusts when a voltage is applied to the pump 50. The current trace identified by (a) corresponds to the time-dependent trace of the pump motor current for an operational tank-venting system without leakage.

The switchover valve 70 is in the position I shown in FIG. 1 in the time interval of FIG. 2 identified by "I". In this position of the switchover valve 70, a pumped flow is introduced into the pump 50 via the reference leak 81. Here, a time-dependent current $i_{mot}$, which is essentially constant, adjusts as shown schematically in FIG. 2 in time interval I.

As soon as the switchover valve 70 is switched over from the position I into the position II, the pump 50 applies an underpressure to the tank-venting system. The pumped flow flows exclusively through the active charcoal filter 20 and therefore all hydrocarbons, which are present in the pumped flow, are filtered out of the pumped flow by the active charcoal filter 20. When switching over, motor current $i_{mot}$ first drops off rapidly and then, with increasing time, drops off continuously until it reaches a value which is greater than or equal to the motor current $i_{mot}$ in the position I of the switchover valve 70. In a time interval III, a saturation value is then present. This time-dependent trace shown with curve (a) in FIG. 2 is characteristic for an operational tank-venting system.

In the case of a leak in the tank-venting system, the curve trace in the time interval II deviates from trace (a) in that the increase in the time interval II is less than in case (a) and that the saturation value, which is present in time interval III, is accordingly likewise less than or equal to the value measured in case (a). The deviation of the curve trace results from the situation that, in the event of a leak, the pumped flow through the pump 50 is increased and therefore the pump motor has to pump against a lesser underpressure than in case (a) whereby the motor current $i_{mot}$ is lower.

It is understood that the foregoing description is that of the preferred embodiments of the invention and that various changes and modifications may be made thereto without departing from the spirit and scope of the invention as defined in the appended claims.

What is claimed is:

1. An arrangement for checking the operability of a vessel, the arrangement comprising:

a pressure source defining a pumping direction;

said pressure source being connected to said vessel with respect to said pumping direction so as to generate an underpressure therein;

a circuit unit connected to said pressure source for detecting and evaluating at least one operating characteristic variable of said pressure source during said underpressure in said vessel; and, said pressure source being a pump and said pump being a vane-cell pump.

2. An arrangement for checking the operability of a tank-venting system of a motor vehicle, the tank-venting system including a tank, an adsorption filter having a venting line, a connecting line connecting the adsorption filter to the tank, the arrangement comprising:

a pressure source defining a pumping direction;

said pressure source being connected to said tank-venting system with respect to said pumping direction so as to generate an underpressure therein;

a circuit unit connected to said pressure source for detecting and evaluating at least one operating characteristic variable of said pressure source during said underpressure in said tank-venting system; and, said pressure source being a pump and said pump being a vane-cell pump.

* * * * *